Nov. 22, 1966    C. D. ARMENIADES ET AL    3,286,992
MIXING DEVICE
Filed Nov. 29, 1965
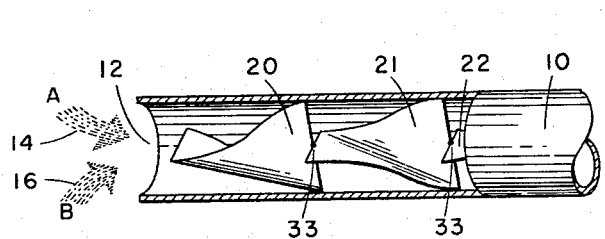
Fig. 1
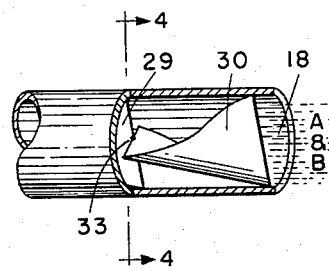
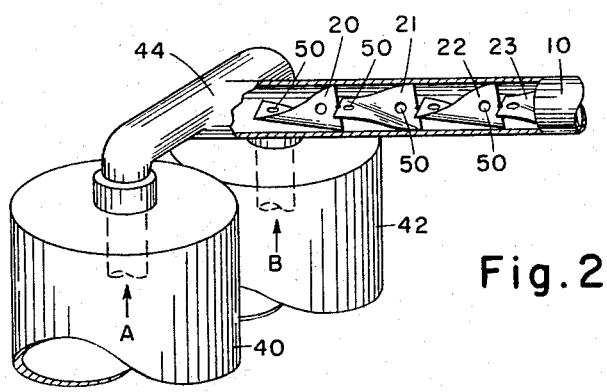
Fig. 2
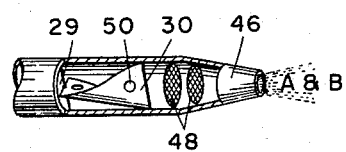
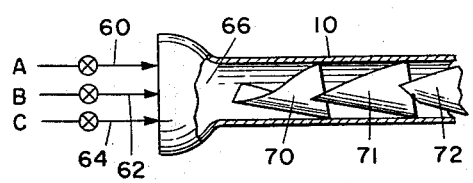
Fig. 3
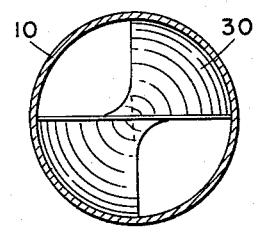
Fig. 4
Constantine D. Armeniades
William C. Johnson
Thomas Raphael
  INVENTORS
BY 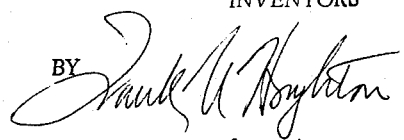
  Agent United States Patent Office 3,286,992
Patented Nov. 22, 1966

3,286,992
MIXING DEVICE
Constantine D. Armeniades, Cleveland Heights, Ohio, William C. Johnson, Palo Alto, Calif., and Thomas Raphael, Winchester, Mass., assignors to Arthur D. Little Inc., Cambridge, Mass., a corporation of Massachusetts
Filed Nov. 29, 1965, Ser. No. 516,205
11 Claims. (Cl. 259—4)

This application is a continuation-in-part of copending application Serial No. 353,714, filed March 23, 1964, now abandoned.

This invention relates to a device for mixing two or more fluid feed materials and dispensing the resulting composition. The feed materials will ordinarily be liquids, or one may be a gas; they may or may not be reactive with one another; and the resulting composition may therefore be a mixture or a compound. However, the invention is particularly useful for the mixing of viscous liquids which react to form a viscous or solid product, e.g. a synthetic resin, and for dispensing or delivering this product to a desired location. The product, if a resin for example, may then harden in that location to its final polymerized condition.

Mixing of two-component spray systems for industrial applications requiring large quantities of resin is customarily accomplished with large, dual gun spraying equipment using compressed air as a propellant. Each component is sprayed from a separate nozzle and the two streams converge and mix before they reach the target. Most resin components are rather viscous liquids which cannot be easily mixed by atomization. Solid fillers (such as chopped fiber glass) may be incorporated in the resin streams from a third spray gun. For applications requiring small quantities of resin, such as undercoating or body patching of automobiles, waterproofing and repairing of small boats, and similar batch type uses, the resin components have to be mixed manually in small quantities before each application.

In the formation of resins by mixing within a chamber and dispensing therefrom, it is particularly important to provide a truly thorough mixing and yet avoid a significant pressure drop through the device. It is also important to avoid aeration.

A number of devices are known for mixing liquid resin components to form a viscous resin product. Among these are devices using a single helix in a cylindrical mixing chamber, as shown in U.S. Patent 2,847,649, or a double helix, as shown in U.S. Patent 2,847,196. Another type of device effects the mixing in a packed chamber, as typified by U.S. Patent 2,894,732. With the helix-type apparatus, although pressure drop therethrough is usually minor, the mixing is not dependably thorough, so that among other things the dispensed product may not be uniform. The packed chamber, while providing thorough mixing causes a substantial pressure drop which, at least for the more viscous resins, is prohibitive.

In accordance with this invention, we provide a device which mixes and sprays or delivers automatically the two or more components from their separate containers and eliminates the delay, inconvenience and possible error in the proportions of the components which is inherent in manual mixing. Furthermore, the convenience and ease of application with this device should greatly expand the uses of two (or more) component resin systems, especially in the areas of surface protection and waterproofing for which epoxy resins and polyesters are superior to the presently used air-drying paints.

The device of the present invention combines the minor pressure drop features of the helix arrangements with the thorough mixing of the packed chamber, but by a different configuration of parts and without the above-mentioned disadvantages of each type. This device also avoids aeration of the product, and minimizes clean-out problems after use. These results are accomplished by the arrangement and configurations hereinafter described, and as illustrated in the accompanying drawings, which are to be considered as exemplary rather than limiting, and wherein:

FIG. 1 is a perspective view, partly in section, of a simple form of the device of this invention;

FIG. 2 is a view, partly in section, of another arrangement, including associated parts;

FIG. 3 is a view, partly in section, showing another arrangement of mixing parts and means for introducing three or more streams of fluid into the device; and FIG. 4 is a cross-sectional view along lines 4—4 of FIG. 1.

In FIG. 1, the numeral 10 represents a hollow cylindrical tube of uniform cross-section; this tube has a feed end 12 into which feed liquids A and B are fed through lines 14 and 16, and a delivery or dispensing end 18, out of which the product of A and B, thoroughly homogeneous, is delivered or dispensed. Within tube 10 are several curved elements 20, 21, 22 . . . 29, 30. Each of these curved elements may be considered as being made of a thin flat sheet, whose width equals the diameter of the tube, whose length is preferably 1.25 to 1.5 times its width, and which has been twisted so that the two ends (i.e. the upstream and downstream edges which are substantially flat) are at a substantial angle to each other. As will appear hereinafter, for some purposes, particularly for mixing of highly viscous fluids flowing at low pressures, the latter angle is between 110° to 120°, although the total angle through which the element is twisted can vary considerably, for example from as little as 60° to as much as 210°. In FIG. 1, for the sake of clarity in representation, the twist angle is shown as 90°.

These elements are positioned so that the downstream edge of any one of them is immediately adjacent and at an angle to the upstream edge of the next adjacent one. This later or contact angle can vary considerably; where the successive element has the same twist direction as the preceding element, the angle preferably lies between 30° to 40°; where the successive element is in an opposite twist direction to the preceding element, the angle is around 90°. In either case, the angle should be between 30° to 150°. When the contact angle between the edges of elements approaches zero (or 180°) the number of elements for effective mixing will be so large as to be impractical. The curved elements 20, 21, 22 . . . 29, 30 may be separate entities, although for convenience in assembly it is better that they be physically connected, e.g. by welding or brazing at their contact point 33, or by being stamped and formed from one piece of sheet material.

This series of curved elements serves to mix the components of the fluid passing through the tube 10 in the following manner: The initial stream consisting of components A and B strikes the upstream edge of the first element (20), which splits it into two partial streams, preferably but not necessarily equal, each stream containing both components A and B. The twisting configuration of the element imparts on these partial streams a double rotational motion while they move forward through tube 10. As the streams rotate helically in order to follow the element configuration, the velocity of the fluid near the walls of the tube is greater than that of the fluid near the tube center. This results in an eddy current motion within each partial stream, which causes some mixing of components A and B. As the fluid meets the upstream edge of the second element (21), it is forced to split again along a new surface creating two new partial streams, each of them now combining portions of both previous partial streams. The compounds of these streams are again forced to mix by the aforementioned eddying motion, while the two streams rotate helically following the configuration of element 21. This process is repeated with each element as the fluid travels along tube 10 until the original multicomponent stream has been split and recombined along new surfaces by a number of elements sufficient for thorough mixing of the original components, to provide a final mixture of compound.

In the arrangement shown in FIG. 1, the even-numbered elements (20, 22 . . . 30) have a left-hand spiral or helical twist or turning, and the odd-numbered elements (21 . . . 29) have a right-hand spiral turning. The turning may, however, be random, or may be all in one direction, as described in more detail in connection with FIG. 3. In one preferred configuration, the direction of twist should reverse at about every third or fourth element; in another preferred configuration, the direction of twist reverses with each successive element.

As the curved elements 20, 21, 22 . . . 29, 30 are of uniform thickness, it is evident that the total cross-sectional area of both passageways within tube 10 is constant throughout the length of the tube. Consequently, there is no significant impediment to the passage of fluids through the tube resulting from changes in cross-sectional area. It is also important that the elements be in contact with the inner wall of tube 10 along the entire length of each of their longitudinal sides; otherwise, some of the feedstocks may bypass at least a part of the mixing operation, with consequent deleterious effect upon the characteristics of the product.

In the operation of the device shown in FIG. 1, the entering fluids A and B are fed in such a manner that each of the passageways above and below the upstream edge of element 20 contains a portion of both fluids. In the embodiment shown in FIG. 1, element 20 causes a left-hand (counterclockwise) turning of the fluid streams, but in practice it is immaterial which direction the first turn takes. When the fluids leave element 20, each is split into two new parts, one of which travels on one side of element 21 and the other on the other side. These parts are given a right-hand (clockwise) turn, and are again split when they reach element 22.

In the arrangement shown in FIG. 2, wherein like numerals refer to like parts as in FIG. 1, feed materials A and B, in containers 40 and 42 respectively, are forced by any suitable means into header 44 and thence into tube 10, which contains elements 20, 21, 22, 23 . . . 29, 30 arranged as in FIG. 1. Tube 10 terminates in a nozzle 46, which may contain one or more screens 48, placed beyond the last of the curved elements. These curved elements differ from those in FIG. 1 only in that they contain perforations 50. These perforations in some cases improve the thoroughness of mixing, although they have little if any effect on the mixing of viscous liquids (>1500 cps.) at lower linear velocities (ca.<60 ft./min.).

In the FIG. 2 arrangement, there will be a minor amount of mixing of the feed materials A and B when they meet in header 44 and proceed into tube 10. Similarly, in the FIG. 1 arrangement, A and B may mix somewhat just before they reach element 20.

FIG. 3 shows a provision for supplying more than two feed materials, and an arrangement of the curved elements which is other than alternating right and left-handed. In the FIG. 3 arrangement, fluids A, B, and C are fed through valve-controlled lines 60, 62, and 64, respectively, into a plenum chamber 66, whence they pass, after some minor mixing, into tube 10, wherein they are repeatedly turned and split by curved elements 70, 71, 72 . . . These elements are arranged with random turnings, rather than alternating right- and left-hand. All these elements may, in fact, turn in the same direction, provided that each successive element splits the liquid stream in a different manner, creating, thus, a new mixing surface. While chamber 66, like header 44, produces little appreciable mixing, it can serve to eliminate "drooling" in intermittent delivery systems.

In addition to the advantages of thorough mixing and low pressure drop, is that of low cost. Thus, the devices of the invention may be made by inserting a string of preformed elements into a tube of suitable diameter, all made from inexpensive materials such as polyethylene. After a run of resin, for example, or other setting material, it may be advantageous to discard the device rather than attempting to clean it. Obviously, either one or the other must be done as otherwise the resin will set within the tube and render the latter useless.

When resin systems are mixed, two additional variables can affect the properties of the cured resin after it is sprayed. Diffusion of the catalyst from catalzyed to uncatalyzed areas before the resin hardens tends to improve the homogeneity of the system. On the other hand, a difference in density between the two components tends to separate them, especially if the mixing is incomplete. Any deleterious consequences from the effects of these variables are overcome by the use of the device of the present invention.

The following runs demonstrate the effect of using various numbers of surface generating (curved) elements, in the curing of polyester resins. The tube 10 was ¼-inch I.D. in these runs. The resin used was a two component polyester system "Stypol 40-2907" (Freeman Chemical Corp.), one component of which was catalyzed with 2% MEK peroxide; the other contained 1% cobalt naphthenate accelerator. These two components have a good shelf life while stored separately. Upon mixing, however, the combined action of the catalyst and the accelerator causes them to polymerize rapidly at room temperature, forming a hard, nonfusible solid. The tensile strength and hardness of the cured resin depend upon the thoroughness of mixing. In this run the two components were dyed white and violet, respectively, in order to observe the mixing action. The properties of the resulting cured resins are shown in Table I and compared with the properties of a control sample mixed thoroughly by hand.

TABLE I

| No. of Elements | Tensile Strength (p.s.i.) | Hardness (Shore D) | Appearance |
| --- | --- | --- | --- |
| 4 | 60 | 25-70 | Tacky, non-uniform. |
| 6 | 150 | 30-70 | Tacky, non-uniform. |
| 8 | 460 | 45-70 | Slightly tacky, uniform. |
| 10 | 2,800 | 55-65 | No tackiness, flexible. |
| 11 | 6,500 | 65-70 | No tackiness, rigid. |
| 12 | 6,350 | 60-70 | No tackiness, rigid. |
| Hand-mixed | 6,450 | 60-70 | No tackiness, rigid. |

Table I shows that eleven elements are required in the ¼-inch nozzle for the sprayed polyester to attain the tensile strength of the hand-mixed sample.

A 3/16-inch I.D. tube 10 was subsequently constructed using ten elements each perforated with two 1/16-inch diameter holes to promote mixing. The tube was used to dispense samples of epoxy and polyester resins. Table II shows the tensile strength of the cured resins. It is similar (and sometimes superior) to that of the hand-mixed samples. The Epon 815, a product of Shell Chemical Corporation, is an example of epoxy resin; it is an epichlorhydrinbisphenol A polymer. The Genamid 230, a product of General Mills Company, is an example of a curing agent for the epoxy resin; it is a resinous amine adduct and cross-links with the epoxy resin to form the final product. Proportions used may vary widely, but in the table below they are 65 parts by weight Epon to 35 parts by weight Genamid.

TABLE II

| Resin System | Tensile Strength | |
|---|---|---|
| | Hand-Mixed Sample | Mixed in Tube (average of 3 samples) |
| Epon 815, Genamid (clear casting) | 5,640 | 4,810±1,000 |
| Epon 815, Genamid (pigmented, cured at 100° C) | 6,590 | 7,240±1,500 |
| Stypol 40-2907 with 2% MEK peroxide | 6,310 | 6,830±500 |
| Stypol 40-2907 with cobalt naphthenate | | |

The device of this invention is also suitable in spraying polyurethane foams using Freon both as blowing agent and as propellant. Both rigid and flexible foams can be made in this manner.

In this connection, a number of laboratory tests were made using "Chempol 30–1428" and "Chempol 30–1325" (products of Freeman Chemical Corp.) in the weight ratio of 100:76.5 with Freon 11 ($CCl_3F$) to obtain rigid foams. Since thorough mixing of the components is extremely important for the formation of small and evenly distributed cells, Freon 11 was incorporated in both components, and a 3/16-inch I.D. tube with thirteen perforated elements was used. The resultant polyurethane foams were excellent, comparable in cell size and uniformity, with the foams made by carefully hand-mixing the components according to the manufacturer's directions. Screen packing of the nozzle 46 increases the uniformity of the cell size even further.

The intersurface generating (curved) elements 20, 21, 22 . . . can be easily manufactured commercially from a single metal strip using a combination punching and forming machine. They can be subsequently inserted in the tube 10 made of plastic tubing. A straight tube with ten to fourteen elements should be less than 6 inches long. The number of elements desired for complete mixing increases with the viscosity of the fluids being mixed. Thixotropic materials particularly require a large number of elements since they tend to form stationary pockets around some elements. The degree of mixing required, for example to cure common epoxy and polyester systems is less than typically needed to eliminate striations in a system with differently pigmented components. For example, a 1/4" I.D. nozzle preferably will use as many as 12 to 14 elements to mix epoxy resins properly. To eliminate dye or pigment striations it is preferred to employ, for example, as many as 16 to 18 elements which have twist angles of about 180° and are arranged in an alternating sequence of right and left-handed twisted elements with contacting edges at 90° to one another. Variations in component proportions up to a ratio of 1/20 do not affect appreciably the performance of the nozzle. If greater compactness is desired, the tube 10 may be formed into a spiral. The pressurized containers of the resin components in the case of epoxy or polyester resins should preferably incorporate a flexible plastic film to separate the resin from the propellant. In the case of polyurethane foams, the blowing agent (Freon) can also be used as propellant as well as being mixed with each of the components.

Many modifications within the scope of the appended claims will be evident to those skilled in the art.

What is claimed is:

1. A device for thorough mixing of a plurality of fluids while conveying them, consisting essentially of a hollow cylindrical tube and a plurality of curved sheet-like elements extending in series longitudinally within said tube throughout the length thereof, each element extending to the tube walls throughout its length and dividing said tube into two separated channels, said elements being arranged alternately and in point-contact with each other and having curvature to turn the direction of the flowing fluid, the edges of each element transverse to the tube being positioned at an angle to the contacting edges of the adjacent elements, the total cross-sectional area of said two channels being substantially constant throughout the length of said tube.

2. A device in accordance with claim 1 wherein said elements are arranged in alternating right- and left-handed curvature groups.

3. A device in accordance with claim 1 wherein said two separated channels are substantially equal in cross-section.

4. A device in accordance with claim 1 wherein the said curvature of each of said elements is sufficient to turn said fluid through approximately between 110° and 120°.

5. A device in accordance with claim 1 wherein said curvature of each of said elements is sufficient to turn said fluid through an angle of between 60° and 210°.

6. A device in accordance with claim 1 wherein the length of each of said elements is between about 1.25 to 1.5 times its width.

7. A device in accordance with claim 1 wherein said elements adjacent said edges are substantially flat.

8. A device in accordance with claim 1 wherein said angle of contacting edges is between 30° to 150°.

9. A device in accordance with claim 1 wherein the angle between contacting edges of elements having the same helical directions is between 30° and 40° and the angle between contacting edges of elements having opposite helical directions is about 90°.

10. A device in accordance with claim 1 wherein said plurality is greater than 10.

11. A device in accordance with claim 1 wherein each of said elements has a curvature sufficient to turn said fluid through approximately 180°, said element being arranged so that elements of right-handed and left-handed curvature alternate with one another, the angle between contacting edges of adjacent elements being about 90°.

References Cited by the Examiner

UNITED STATES PATENTS

| | | | |
|---|---|---|---|
| 2,601,018 | 6/1952 | Heyl et al. | 259–4 |
| 3,182,965 | 5/1965 | Sluijters | 259–4 |
| 3,203,371 | 8/1965 | Mosey | 259–4 XR |
| 3,239,197 | 3/1966 | Tollar | 259–4 |

WALTER A. SCHEEL, *Primary Examiner.*

J. M. BELL, *Assistant Examiner.*